(12) United States Patent
Lewis et al.

(10) Patent No.: US 12,532,169 B2
(45) Date of Patent: *Jan. 20, 2026

(54) COORDINATION OF TRANSMIT AUTHORIZATION IN A SHARED SPECTRUM ENVIRONMENT FOR 5G OR OTHER NEXT GENERATION NETWORK

(71) Applicant: AT&T Intellectual Property I, L.P., Atlanta, GA (US)

(72) Inventors: David Lewis, Freehold, NJ (US); Vazrik Hovsepian, Carrollton, TX (US); Spyridon Kapoulas, Brooklyn, NY (US); Rajeev Jayaram, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 427 days.

This patent is subject to a terminal disclaimer.

(21) Appl. No.: 18/049,300

(22) Filed: Oct. 25, 2022

(65) Prior Publication Data

US 2023/0074567 A1    Mar. 9, 2023

Related U.S. Application Data

(63) Continuation of application No. 16/546,815, filed on Aug. 21, 2019, now Pat. No. 11,510,053.

(51) Int. Cl.
*H04W 12/00* (2021.01)
*H04W 12/06* (2021.01)
*H04W 16/14* (2009.01)
*H04W 48/18* (2009.01)

(52) U.S. Cl.
CPC .......... *H04W 12/06* (2013.01); *H04W 16/14* (2013.01); *H04W 48/18* (2013.01)

(58) Field of Classification Search
None
See application file for complete search history.

(56) References Cited

U.S. PATENT DOCUMENTS

| | | | |
|---|---|---|---|
| 8,849,225 B1 | 9/2014 | Sullivan | |
| 10,411,789 B2 * | 9/2019 | Loehr | H04B 7/15542 |
| 10,681,560 B1 * | 6/2020 | Sevindik | H04W 16/14 |
| 11,632,678 B2 * | 4/2023 | MacMullan | H04W 24/02 455/448 |
| 12,206,552 B2 * | 1/2025 | Guim Bernat | G06F 9/5094 |

(Continued)

OTHER PUBLICATIONS

Non-Final Office Action received for U.S. Appl. No. 16/546,815 dated Nov. 12, 2021, 22 pages.

(Continued)

*Primary Examiner* — Gerald A Smarth
(74) *Attorney, Agent, or Firm* — Guntin & Gust, PLC; Louis Yang

(57) ABSTRACT

Terminal devices can request and receive authorization to transmit on the same channel for which a serving base station that can serve the terminal devices has authorization to transmit. Upon transmit authorization or termination being received from a spectrum administration system, the base station can autonomously update the system information it broadcasts. Thus, terminal devices connected to the serving base station can be informed about the channel on which the terminal device should request authorization to transmit.

20 Claims, 11 Drawing Sheets

(56) References Cited

U.S. PATENT DOCUMENTS

2008/0075033 A1    3/2008  Shattil
2010/0093360 A1    4/2010  Choi et al.
2015/0305051 A1*  10/2015  Xia ..................... H04W 24/08
                                                               370/329

OTHER PUBLICATIONS

Final Office Action received for U.S. Appl. No. 16/546,815 dated Apr. 8, 2022, 20 pages.
Notice of Allowance received for U.S. Appl. No. 16/546,815 dated Jul. 26, 2022, 31 pages.

* cited by examiner

COORDINATION OF TRANSMIT AUTHORIZATION IN A SHARED SPECTRUM ENVIRONMENT FOR 5G OR OTHER NEXT GENERATION NETWORK

RELATED APPLICATION

The subject patent application is a continuation of, and claims priority to, U.S. patent application Ser. No. 16/546,815, filed Aug. 21, 2019, and entitled "COORDINATION OF TRANSMIT AUTHORIZATION IN A SHARED SPECTRUM ENVIRONMENT FOR 5G OR OTHER NEXT GENERATION NETWORK," the entirety of which priority application is hereby incorporated by reference herein.

TECHNICAL FIELD

This disclosure relates generally to facilitating spectrum authorization between transmission devices. For example, this disclosure relates to facilitating spectrum authorization between transmission devices in a shared spectrum environment for a 5G, or other next generation network, air interface.

BACKGROUND $5^{th}$ generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating spectrum authorization between transmission devices is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
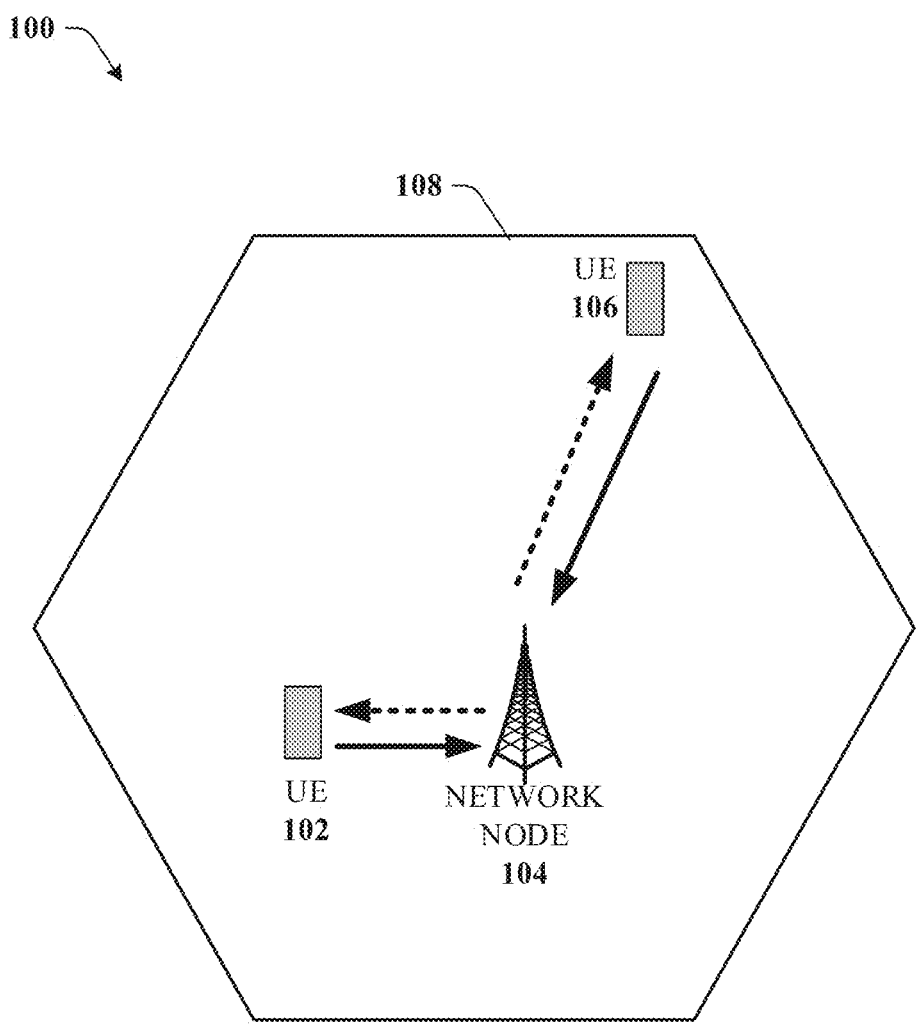
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate spectrum authorization between transmission devices for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.12 technology. Additionally, substantially all aspects disclosed herein can be exploited in legacy telecommunication technologies.

Described herein are systems, methods, articles of manufacture, and other embodiments or implementations that can facilitate spectrum authorization between transmission devices for a 5G network. Facilitating spectrum authorization between transmission devices for a 5G network can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

This disclosure comprises a comprehensive set of procedures under which the network (e.g., a base station) can indirectly control spectrum authorization for devices that also require explicit spectrum authorization. Terminal devices can request and receive authorization to transmit on the same channel(s) for which the serving base stations and other base stations that could serve the terminal devices have authorization to transmit. Upon transmit authorization or termination being received from a spectrum administration system, the base station can autonomously update the system information it broadcasts, so terminal devices connected to the serving base station can be informed about the channel(s) the device should request authorization to transmit on. The base station can select one or more channels, from within a list of authorized channels received from the spectrum administration system, on which to transmit. The channel selection mechanism at the base station can consider radio frequency (RF) measurements and/or include negotiation with the spectrum administration system or other factors. Upon receiving authorization to transmit, the base station can transmit on any of the channels for which it has requested and received authorization from the spectrum administration system.

Terminal devices, independently from and asynchronously with the base station, can obtain authorization from the spectrum administration system for the same channels used by the base station. That requires a procedure by which the base station continuously informs the terminal devices of the channels upon which it is has received authorization to transmit, and by which the terminal device correspondingly obtains and relinquishes its own permission to transmit from the spectrum administration system. Such a procedure can consider the dynamics of shared spectrum operations where transmit authorizations can be granted or terminated by the spectrum administration system at any given time. The terminal device can, through standards-based procedures (e.g., LTE or NR), tune its receiver to and camp on a channel used by the base station and connect to the network on that channel. The terminal device can then request authorization to transmit on the channel that it uses to connect to the network. The base station can generally acquire authorization to transmit on a list of multiple channels, and can also identify this list of channels to the terminal devices it serves. The base station can identify this list of channels to the terminal devices through the use of a "neighbor channel" information broadcast in a standard LTE system information block. An LTE or 5G NR base station (eNB or gNB) can broadcast a group of system information blocks (SIBs) on every channel on which it transmits, providing basic system information to terminal devices to enable them to connect to the network. One of these SIBs (e.g., SIB5) can carry a list of "neighbor channels". This process can be used to inform devices of frequencies to which the device can be handed over as it moves through the network. The proposed solution in this disclosure is for the device to use the list of neighbor channels in the SIB5 to determine the exact channels for which it can request authorization to transmit from the spectrum administration system.

Because the spectrum administration system can independently and asynchronously authorize transmission for base stations and devices, and because the location, orientation, and transmit power of the base station and of each device can differ, it is possible for the spectrum administration system to suspend (temporarily) or revoke (permanently) authorization to transmit on a channel for one or more devices while allowing the serving base station to retain its authorization to transmit on that channel. It is also possible for the spectrum administration system to suspend (temporarily) or revoke (permanently) authorization to transmit on a channel for a base station while allowing one or more devices to retain their authorization to transmit on that channel. In the first case, in the event of a base station attempting to hand over a device to a channel on which the device does not have authorization to transmit, the handover can fail, causing a service interruption. Additionally, should a significant percentage of devices lose authorization to transmit on a frequency, the serving base station can be unable to effectively use that frequency even if it retains authorization to transmit on it.

Channel conditions included in measurement reports from terminal devices to the base station can be used by the base station to decide which channel a device should be handed over and what channel(s) the base station can request permission to transmit from the spectrum administration system. These measurement reports provided by the terminal devices can incorporate information about the channels on which the device has authorization to transmit. Device measurement reports sent to the base station can be utilized as a mechanism for the device to inform the base station about the channels on which it is authorized to transmit. Upon receiving the lists of authorized channels for served terminal devices, the base station can compare the received devices' lists of channels with its own list of authorized channels. If the result of that comparison shows a considerable gap between the two channel lists, the base station can initiate a transmit authorization request towards the spectrum administration system for those channels that the base station is missing authorization to transmit. Standards-based LTE or 5G NR air interface procedures can be used by the serving base station to request a device to provide on-demand and/or scheduled measurement reports for a list of specific channels, as well as for any channels for which the device receives a signal that are not explicitly identified by the serving base station. Under the proposed solution, the device can send on-demand and/or scheduled measurement reports for channels for which it is authorized to transmit by the spectrum administration system. Should the device not be authorized by the spectrum administration system to transmit on a given channel, the device cannot send on-demand or scheduled measurement reports for that channel. Such an approach can prevent the base station from attempting to handover a device to a channel on which it is not authorized to transmit. Per standard LTE or 5G NR air interface procedures, the base station can only handover a device to a channel if the device reports signal measurements for that channel that exceeds signal strength and quality thresholds. The absence of a channel-specific measurement can prevent the handover attempt. Under the proposed solution a processor in the base station and/or in an administrative system receiving aggregated information from the base station(s) can use the set of measurement reports received to evaluate the "robustness" or quality of the channels on which it is authorized to transmit. The processor can aggregate the received measurement data to identify any channels on which the base station is authorized to transmit, but for which an "excessive" (configurable by the network operator) number of connected devices are not reporting measurements (e.g., not themselves authorized to transmit). For that particular channel or channels, the processor can instruct the base station to "relinquish" its authorization to transmit on that channel(s) and possibly request from the spectrum administration system authorization to transmit on a different channel(s) where the same process can begin again.

In another embodiment, devices and base stations can both require periodic reconfirmation of their authorization to transmit (to comply with Federal Communication Commission (FCC) Part 96 rules for the citizens broadband radio service (CBRS) band, this reconfirmation can be no less frequent than every four minutes). Devices and base stations can independently reconfirm transmit authorization, and these procedures can be independent and asynchronous. The spectrum administration system can therefore suspend or revoke a device's authorization to transmit on a specific channel while maintaining transmit authorization for its serving base station on that specific channel. FCC Part 96 rules require a transmitter to stop transmitting on a specific channel within 60 seconds of being so instructed by the spectrum administration system. While the device can independently select a different channel from the list of channels on which it is authorized to transmit and retune to that channel, doing so can result in a service interruption (as the underlying air interface technology requires it to stop transmitting on the channel for which it is no longer authorized before it can begin transmitting on the new channel). Standards-based (e.g., 3GPP LTE or 5G NR) procedures for handover in a wireless network can enable a device to switch from one channel to another without a service interruption. However, handover can be performed under the control of the base station (in mobile networks, signal measurements sent from the device to the base station trigger the base station to initiate a handover). Standards-based devices do not have the capability to autonomously initiate a handover.

This disclosure can manage the timing of the authorization requests by the base station and devices to ensure that, should the spectrum administration system suspend or revoke authorization to transmit for a base station and its served devices, the base station can stop transmitting before the devices are required to stop transmitting. This can be performed by the following: requiring the base station to send its ongoing requests for continued authorization ("heartbeat" messages) more frequently than 60 seconds apart, requiring the base station to stop transmitting on a channel (and initiate handover of all devices connected via that channel) immediately upon receiving an indication that its authorization to transmit has been suspended or revoked, requiring the devices to send their ongoing requests for continued authorization (a.k.a. "heartbeat" message) as infrequently as possible to meet the operational rules (under US FCC Part 96 rules for the CBRS band, this is every four minutes), requiring the devices to wait sixty seconds after receiving an indication that authorization to transmit has been suspended or revoked before autonomously stopping transmitting on the suspended/revoked channel and selecting a new channel to transmit on.

In one embodiment, described herein is a method comprising receiving, by a first network device comprising a processor, authorization data representative of an authorization to transmit a signal via a wireless channel from a second network device of a wireless network. The method can comprise selecting, by the first network device, the wireless channel from a group of channels for a wireless transmission in response to the receiving. Additionally, in response to the selecting the wireless channel for the wireless transmission, the method can comprise updating, by the first network device, channel data representative of the wireless channel to be used for the wireless transmission.

According to another embodiment, a system can facilitate receiving, from a wireless network device, authorization data, representative of an authorization to utilize a first wireless channel of a wireless network. The system can comprise receiving, from a base station device, channel data, representative of the first wireless channel, to be used for a transmission with the base station device of the wireless network. Furthermore, in response to the receiving the channel data, the system can comprise relinquishing an ability to transmit wireless data via a second wireless channel of the wireless network.

According to yet another embodiment, described herein is a machine-readable storage medium that can perform the operations comprising receiving, from a first wireless network device of a wireless network, permission data representative of a permission to transmit a signal via a wireless channel. In response to the receiving the permission data, the machine-readable storage medium can perform the operations comprising transmitting the signal via the wireless channel. Additionally, in response to the transmitting of the signal, the machine-readable storage medium can perform the operations comprising receiving an indication of a selection of the wireless channel for a transmission by a second wireless network device to the base station device.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IoT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks that facilitate providing wireless communication services to various UEs, including UE 102, via the network node 104 and/or various additional network devices (not shown) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks can be or include the wireless communication network and/or various additional devices and components of the wireless communication network (e.g., additional network devices and cell, additional UEs, network server devices, etc.). The network node 104 can be connected to the one or more communication service provider networks via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102, 106 and the network node 104). While example embodiments might be described for 5G new radio (NR) systems, the embodiments can be applicable to any radio access technology (RAT) or multi-RAT system where the UE operates using multiple carriers e.g., LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network can utilize higher frequencies (e.g., >6 GHz) to aid in increasing capacity. Currently, much of the millimeter wave (mmWave) spectrum, the band of spectrum between 30 gigahertz (GHz) and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
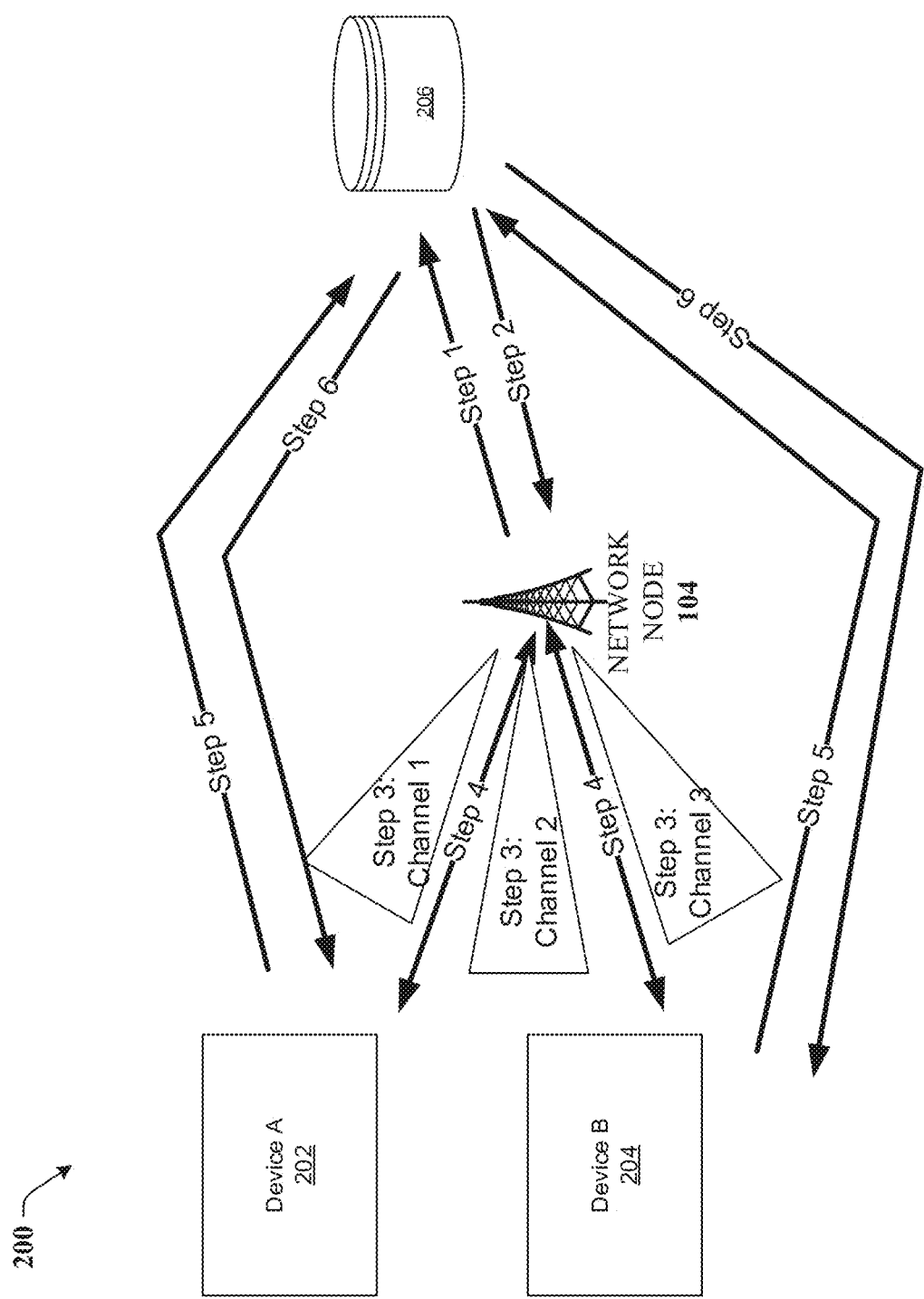
FIG. 2 illustrates an example schematic system block diagram of transmission grant coordination according to one or more embodiments.

Referring now to FIG. 2, illustrated is an example schematic system block diagram of transmission grant coordination according to one or more embodiments. FIG. 2 illustrates the system 200 comprising steps 1-6. At step 1, the base station 104 can request authorization from the spectrum administration system 206 for three channels (e.g., 1, 2, and 3. At step 2, the spectrum administration system 206 can provide authorization for channels 1, 2, and 3. At step 3, the base station 104 can begin transmitting on the three authorized channels 1, 2, and 3. At step 4, using standard LTE or 5G NR air interface procedures (it should be noted that other air interface procedures are possible), devices (e.g., device A and device B) in range of the base station 104 can select a channel to connect to the network. Assume device A 202 selects channel 1, and device B 204 selects channel 3. At step 5, device A 202 can request authorization for channel 1 based on its selection of channel 1 to connect to the base station 104, and device B 204 can request authorization for channel 3 based on its selection of channel 3 to connect to the base station 104. Consequently, at step 6, devices A and B can receive authorization to transmit on channels 1 and 3, respectively.

Figure 3:
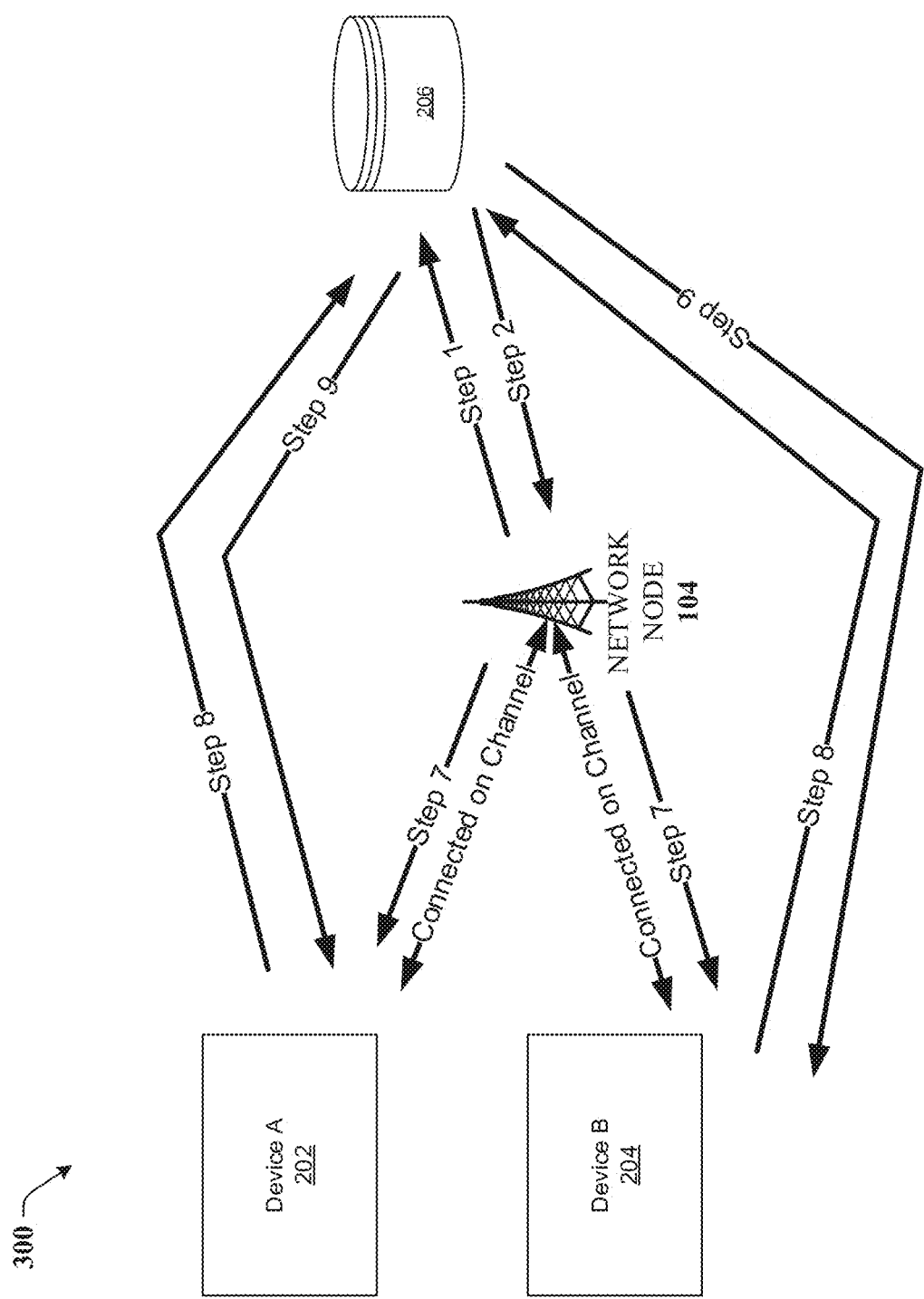
FIG. 3 illustrates an example schematic system block diagram of transmission grant coordination according to one or more embodiments.

Referring now to FIG. 3, illustrated is an example schematic system block diagram of transmission grant coordination according to one or more embodiments. In addition to the above, FIG. 3 depicts a system 300 comprising steps 7-9 continued from FIG. 2. Device A 202 can be connected on channel 1 and device B 204 can be connected on channel 3. At step 7, the base station 104, as part of standard LTE or 5G NR air interface processing, can broadcast a SIB5 message, on channel 1, that contains the identities of channel 2 and channel 3, and broadcast a SIB5 message, on channel 3, that contains the identities of channel 1 and channel 2. At step 8, the device A can request authorization for channel 2 and for channel 3 based on receiving the identities of channel 2 and channel 3 in the SIB5 message. Device B can request authorization for channel 1 and for channel 2 based on receiving the identities of channel 1 and channel 2 in the SIB5 message. At step 9, the devices A and B can receive authorization to transmit on channels 2 and 3, and 1 and 2, respectively.

Figure 4:
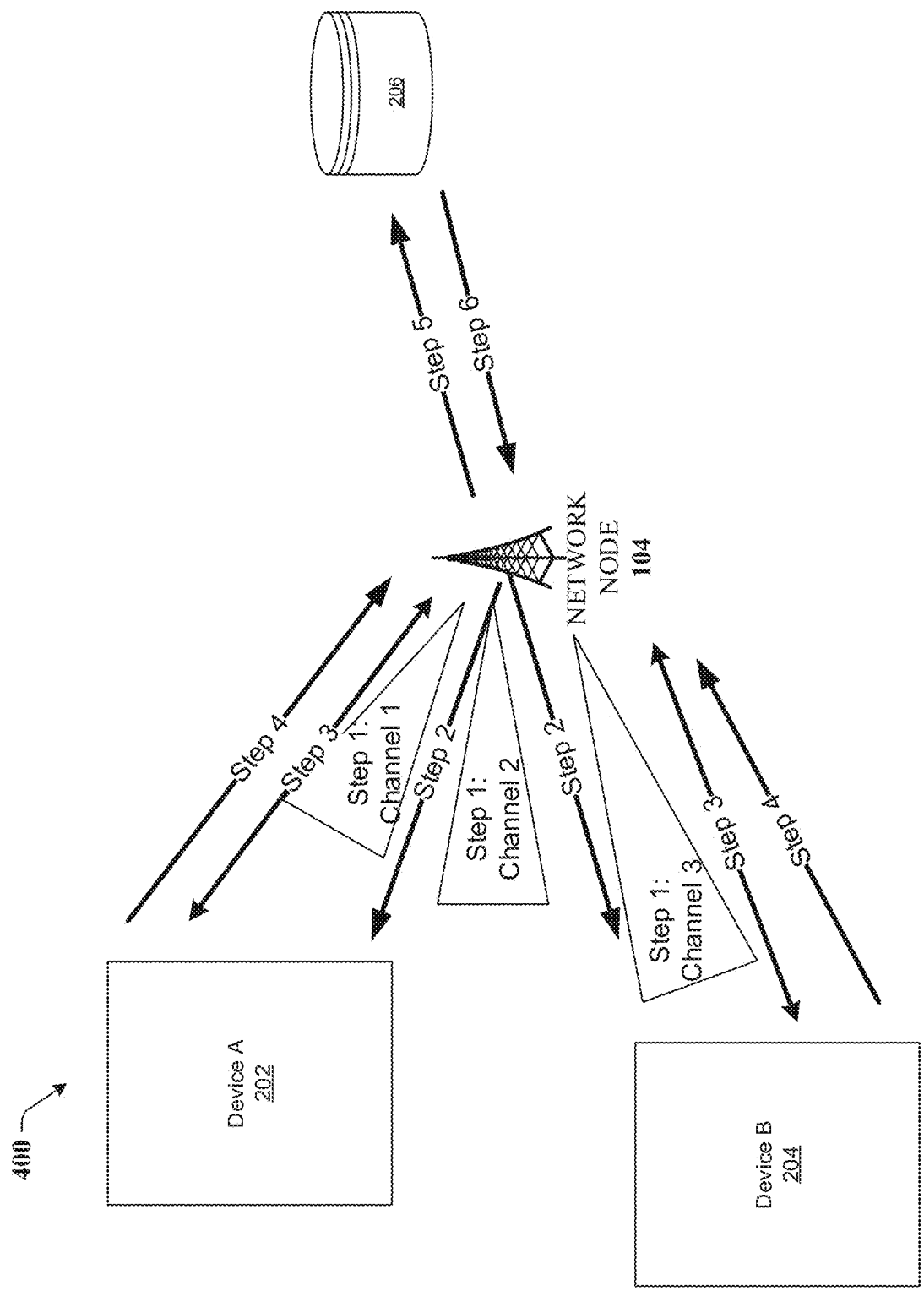
FIG. 4 illustrates an example schematic system block diagram of transmission grant coordination according to one or more embodiments.

Referring now to FIG. 4, illustrated is an example schematic system block diagram of transmission grant coordination according to one or more embodiments. FIG. 4 depicts an alternative embodiment comprising steps 1-6. At step 1, the base station 104 can be authorized and transmitting on channels 1, 2, and 3. At step 2, all of the served devices (e.g., device A and device B) can be authorized to transmit on channels 1 and 3, but few or no attached devices are authorized to transmit on channel 2 (e.g., because the spectrum administration system has revoked or suspended the authorization to transmit on that channel for the devices due to their location and/or orientation while not revoking or suspending it for the base station). At step 3, device A 202 can be connected on channel 1 and device B 204 can be connected on channel 3. At step 4. devices A and B can send measurement reports (periodically and/or on-demand) for channels 1 and 3, but not for channel 2, because they are not authorized to transmit on channel 2 At step 5, a processor at the base station 104, based on aggregated information from the device measurement reports, can determine that a significant number of devices are not authorized to transmit on channel 2, and that one or more other channels (e.g., channel 4) is suitable to be used instead of channel 2. The processor can then instruct the base station 104 to relinquish authorization to transmit on channel 2, and to request authorization to transmit on new channel 4. At step 6, the spectrum administration system 206, upon receipt of the requests from the base station 104, can release the base station's 104 authorization to transmit on channel 2 and provide the base station 104 with authorization to transmit on channel 4.

Figure 5:
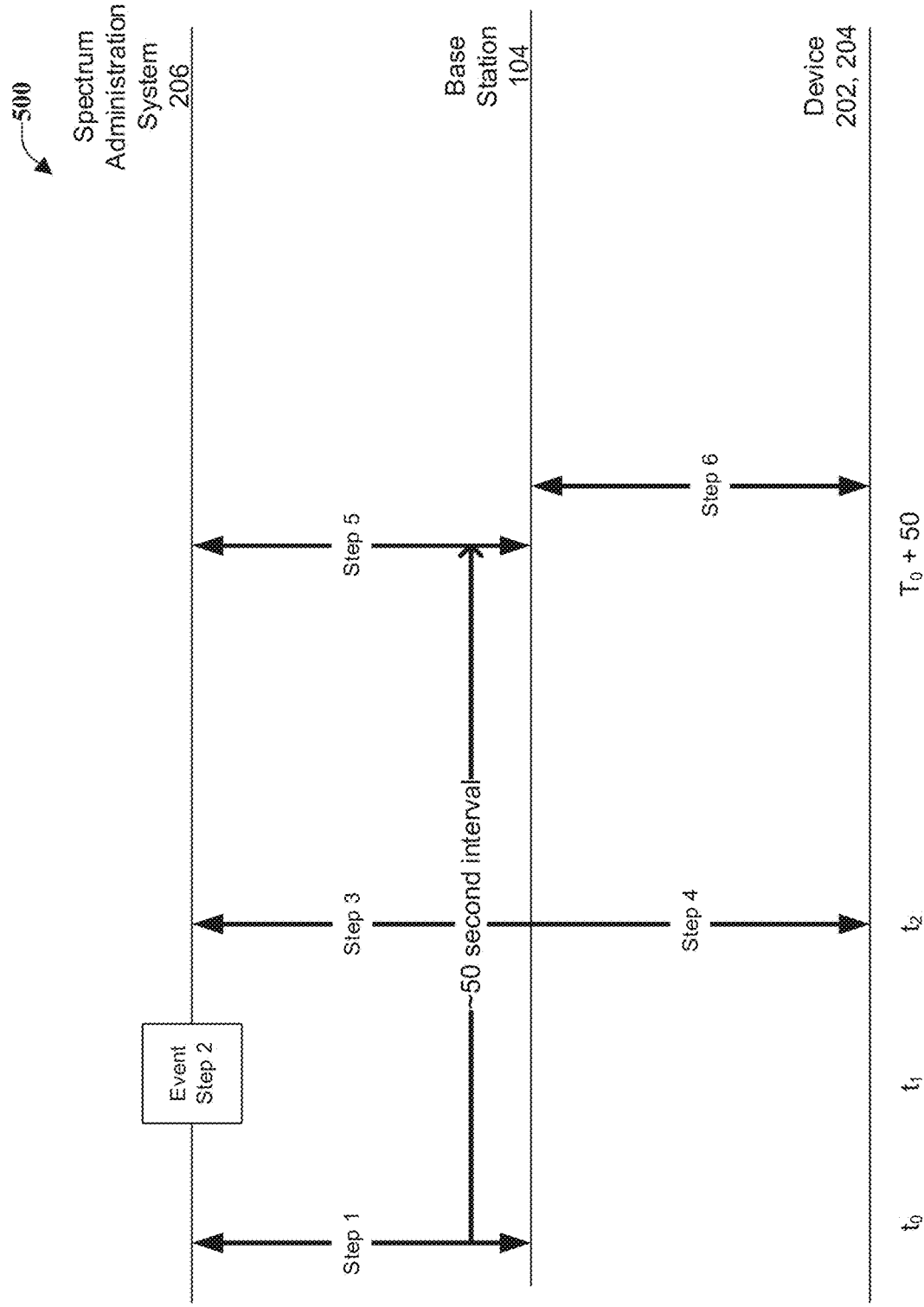
FIG. 5 illustrates an example schematic system block diagram of a device transmission suspension notice according to one or more embodiments.

Referring now to FIG. 5 illustrates an example schematic system block diagram of a device transmission suspension notice according to one or more embodiments. FIG. 5 depicts the case where the device (e.g., device A 202, device B, 204) receives an indication that its authorization to transmit on a frequency has been suspended or revoked before its serving base station 104 receives the equivalent indication, but the solution discussed above enables a non-service-affecting handover to be initiated by the base station 104. At step 1, the base station 104 can send a "heartbeat" message to the spectrum administration system 206 and receive continued authorization to transmit on a channel. At step 2, immediately after this heartbeat message, an event 503 can occur that triggers the spectrum administration system 206 to suspend transmit authorization on a channel in use by the base station 104 and some set of served devices. Because the authorization process is a "query/response" heartbeat initiated by the base station 104 and devices (e.g., device A 202, device B, 204), the spectrum administration system 206 does not proactively inform the base station 104 or devices (e.g., device A 202, device B, 204), but waits for their next heartbeat message. At step 3, immediately after the event occurs, a device (e.g., device A 202, device B, 204) can send a "heartbeat" message to the spectrum administration system 206 and receive an indication that its authorization to transmit on the channel it is using has been suspended. At step 4, the device (e.g., device A 202, device B, 204) can take no immediate action, but starts a 60-second timer. It should be noted that any time can be used for the timer. At step 5, less than 60 seconds after the previous heartbeat message (sent in step 1 above), the base station 104 can send a subsequent heartbeat message to the spectrum administration system 206, and receive an indication that its authorization to transmit on the channel used by one or more devices has been suspended. Because the device is running a 60-second timer, this indication can be received before the device timer runs out. At step 6, the base station 104 can immediately initiate handover of the served devices (e.g., device A 202, device B, 204) on that channel to a different channel. This can occur prior to the device timer running out, and maintains service continuity for the devices. Upon completion of the handover, the device is no longer transmitting on the channel for which the spectrum administration system suspended its authorization to transmit (meeting the requirements of the FCC rules to stop transmitting within 60 seconds of receiving an indication that authorization has been suspended).

Figure 6:
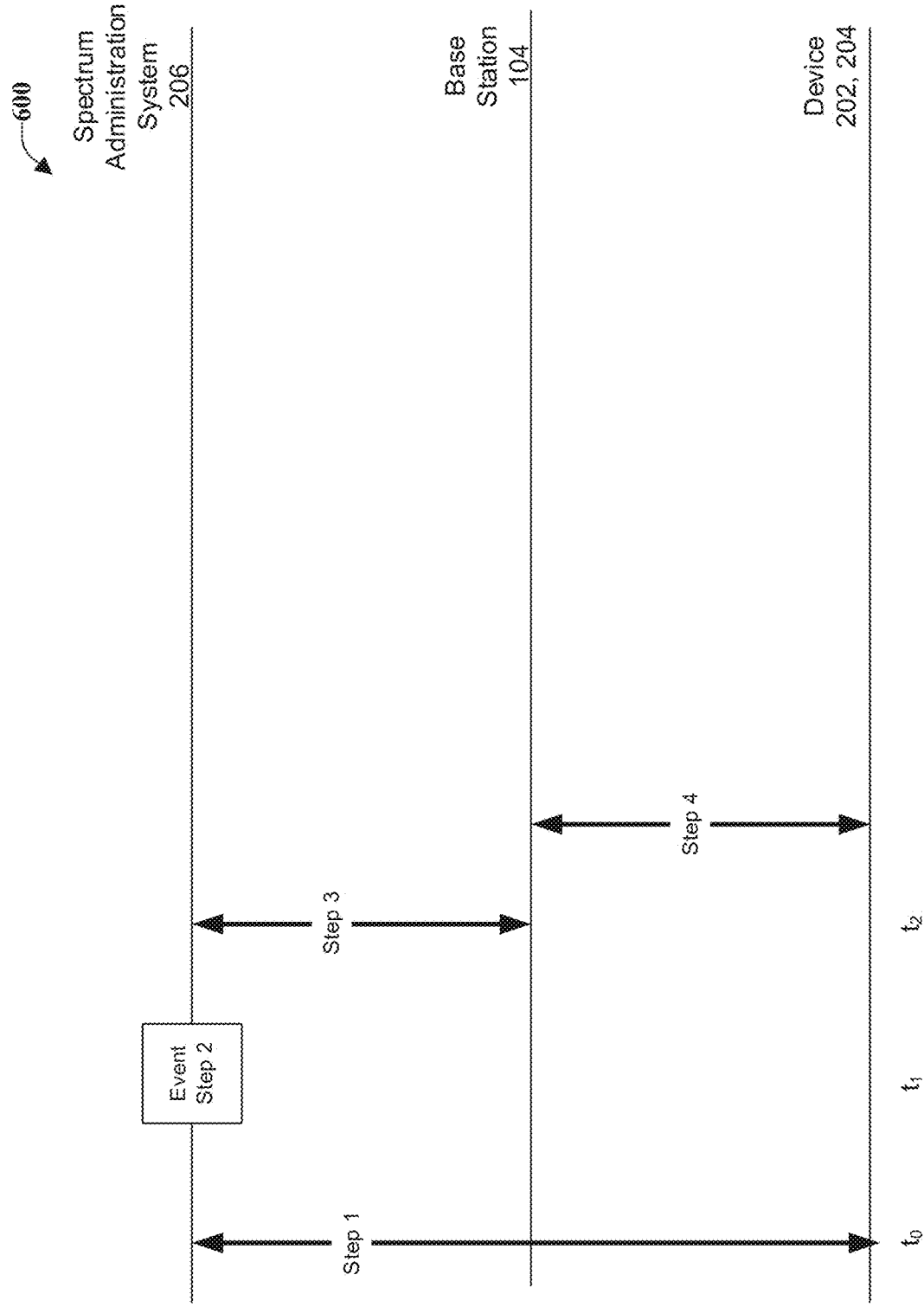
FIG. 6 illustrates an example schematic system block diagram of a base station transmission suspension notice according to one or more embodiments.

Referring now to FIG. 6, illustrated is an example schematic system block diagram of a base station transmission suspension notice according to one or more embodiments. FIG. 6 depicts a simpler case where the base station 104 can receive an indication that its authorization to transmit on a channel has been suspended or revoked before a connected device (e.g., device A 202, device B, 204) receives the equivalent indication. At step 1, the device (e.g., device A 202, device B, 204) can send a "heartbeat" message to the spectrum administration system 206 and receive continued authorization to transmit on a channel. At step 2, at any point after this heartbeat, an event can occur that triggers the spectrum administration system 206 to suspend transmit authorization on a channel in use by the base station 104 and some set of the served devices (e.g., device A 202, device B, 204). Because the authorization process is a "query/response" heartbeat initiated by the base station 104 and devices (e.g., device A 202, device B, 204), the spectrum administration system 206 does not proactively inform the base station 104 or devices (e.g., device A 202, device B, 204), but waits for their next heartbeat message. At step 3, after the event occurs, the base station 104 can send a "heartbeat" message to the spectrum administration system 206 and receive an indication that its authorization to transmit on the channel it is using has been suspended. At step 4, the base station 104 can immediately initiate handover of the served devices (e.g., device A 202, device B, 204) on that channel to a different channel. Upon completion of the handover, the device (e.g., device A 202, device B, 204) is no longer transmitting on the channel for which the spectrum administration system 206 suspended the base station's 104 authorization to transmit. No less than four minutes after the previous heartbeat (sent in step 1 above), the device (e.g., device A 202, device B, 204) can send a subsequent heartbeat message to the spectrum administration system 206, and receive an indication that its authorization to transmit on the channel (from which it was handed over in step 4 above) has been suspended. Because it is no longer transmitting on that channel (due to the handover), it meets the requirements of the FCC rules to stop transmitting within 60 seconds of receiving an indication that authorization has been suspended without taking any further action. Because it is possible (due to differences in antenna position and orientation as discussed elsewhere) that the spectrum administration system 206 can suspend or revoke a device's (e.g., device A 202, device B, 204) authorization to transmit on a channel but not suspend or revoke the serving base station's 104 authorization to transmit on that channel, expiration of the 60-second device timer discussed above can result in the device (e.g., device A 202, device B, 204) autonomously stopping transmission and selecting a new channel to connect to the network. In this case, there can be a service interruption, but the device (e.g., device A 202, device B, 204) will not be isolated from the network.

Figure 7:
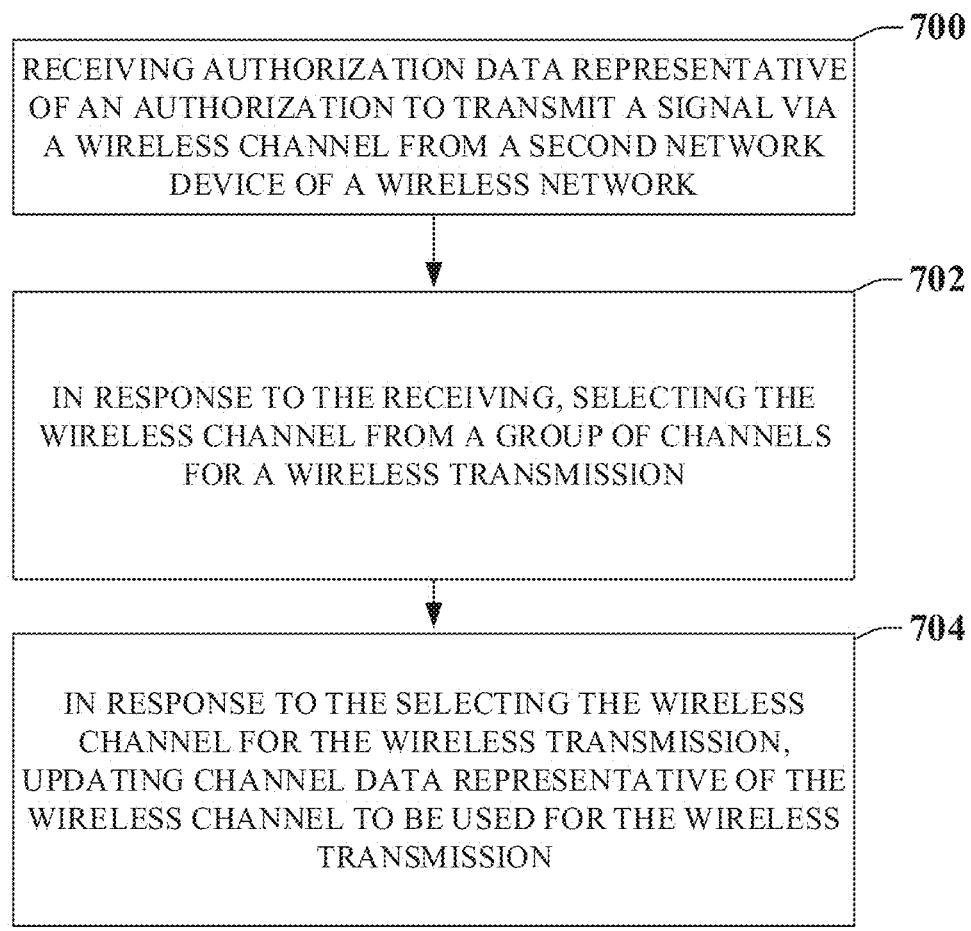
FIG. 7 illustrates an example flow diagram for a method for transmission authorization according to one or more embodiments.

Referring now to FIG. 7, illustrated is an example flow diagram for a method for transmission authorization according to one or more embodiments. At element 700, a method can comprise receiving, by a first network device (e.g., device A 202), authorization data representative of an authorization to transmit a signal via a wireless channel from a second network device (e.g., spectrum administration system 206) of a wireless network 200. At element 702, the method can comprise selecting, by the first network device (e.g., device A 202), the wireless channel from a group of channels for a wireless transmission in response to the receiving. Additionally, in response to the selecting the wireless channel for the wireless transmission, at element 704, the method can comprise updating, by the first network device (e.g., device A 202), channel data representative of the wireless channel to be used for the wireless transmission.

Figure 8:
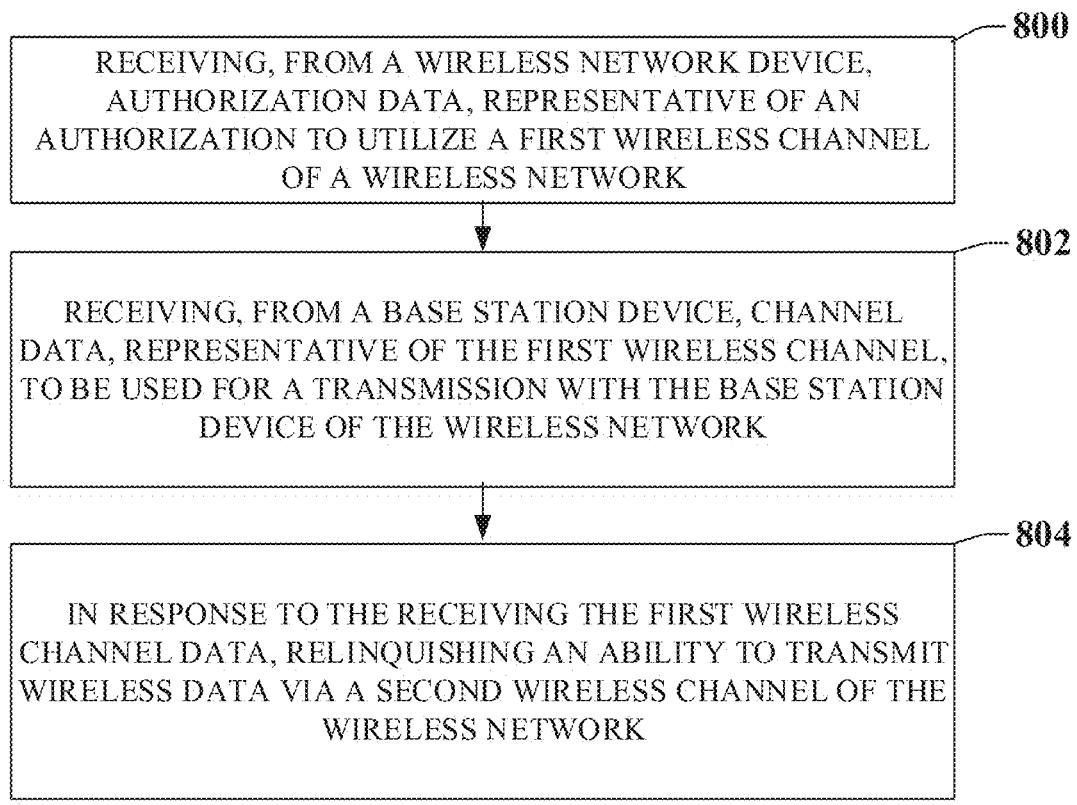
FIG. 8 illustrates an example flow diagram for a system for transmission authorization according to one or more embodiments.

Referring now to FIG. 8, illustrated is an example flow diagram for a system for transmission authorization according to one or more embodiments. At element 800 a system can facilitate receiving, from a wireless network device (e.g., spectrum administration system 206), authorization data, representative of an authorization to utilize a first wireless channel of a wireless network. At element 802, the system can comprise receiving, from a base station device (e.g., network node 104), channel data, representative of the first wireless channel, to be used for a transmission with the base station device (e.g., network node 104) of the wireless network. Furthermore, in response to the receiving the channel data, at element 804, the system can comprise relinquishing an ability (e.g., device A 202, device B 204) to transmit wireless data via a second wireless channel of the wireless network.

Figure 9:
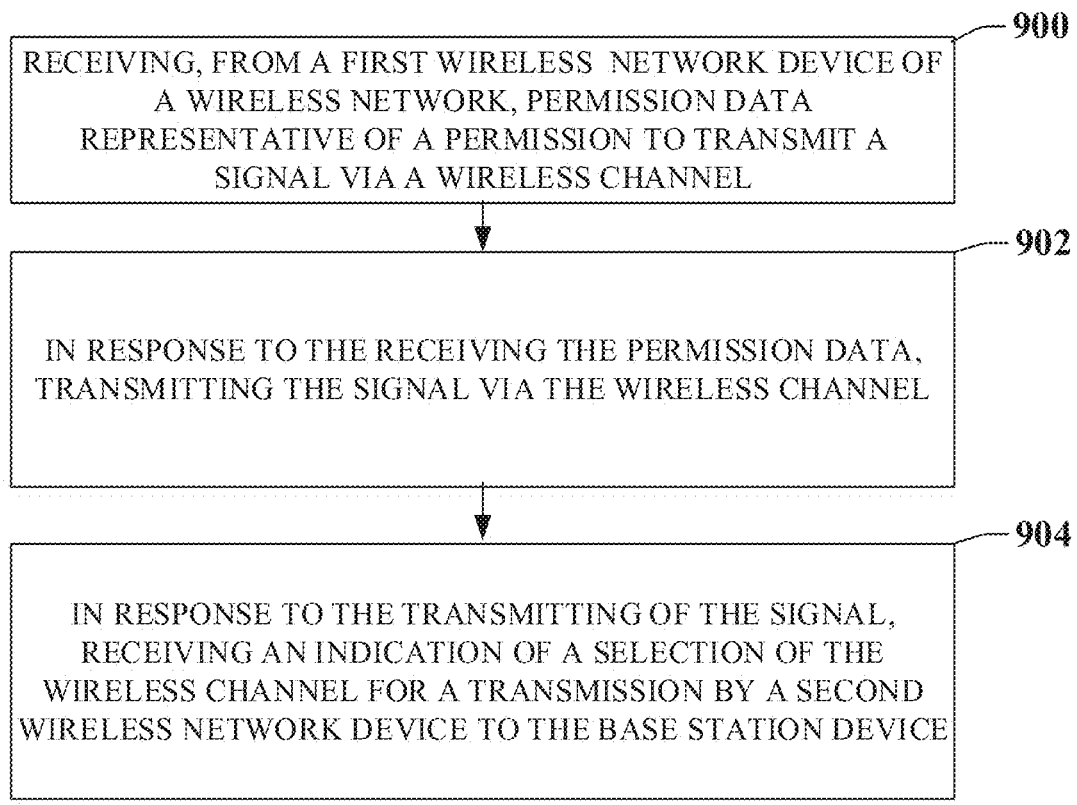
FIG. 9 illustrates an example flow diagram for a machine-readable medium for transmission authorization according to one or more embodiments.

Referring now to FIG. 9, illustrates an example flow diagram for a machine-readable medium for transmission authorization according to one or more embodiments. At element 900, a machine-readable storage medium that can perform the operations comprising receiving (via network node 104), from a first wireless network device (e.g., spectrum administration system 206) of a wireless network, permission data representative of a permission to transmit a signal via a wireless channel. In response to the receiving (via the network node 104) the permission data, the machine-readable storage medium can perform the operations comprising transmitting (via the network node 104) the signal via the wireless channel at element 902. Additionally, in response to the transmitting of the signal, the machine-readable storage medium can perform the operations comprising receiving (via the network node 104) an indication of a selection of the wireless channel for a transmission by a second wireless network device (e.g., device B 204) to the base station device (e.g., the network node 104) at element 904.

Figure 10:
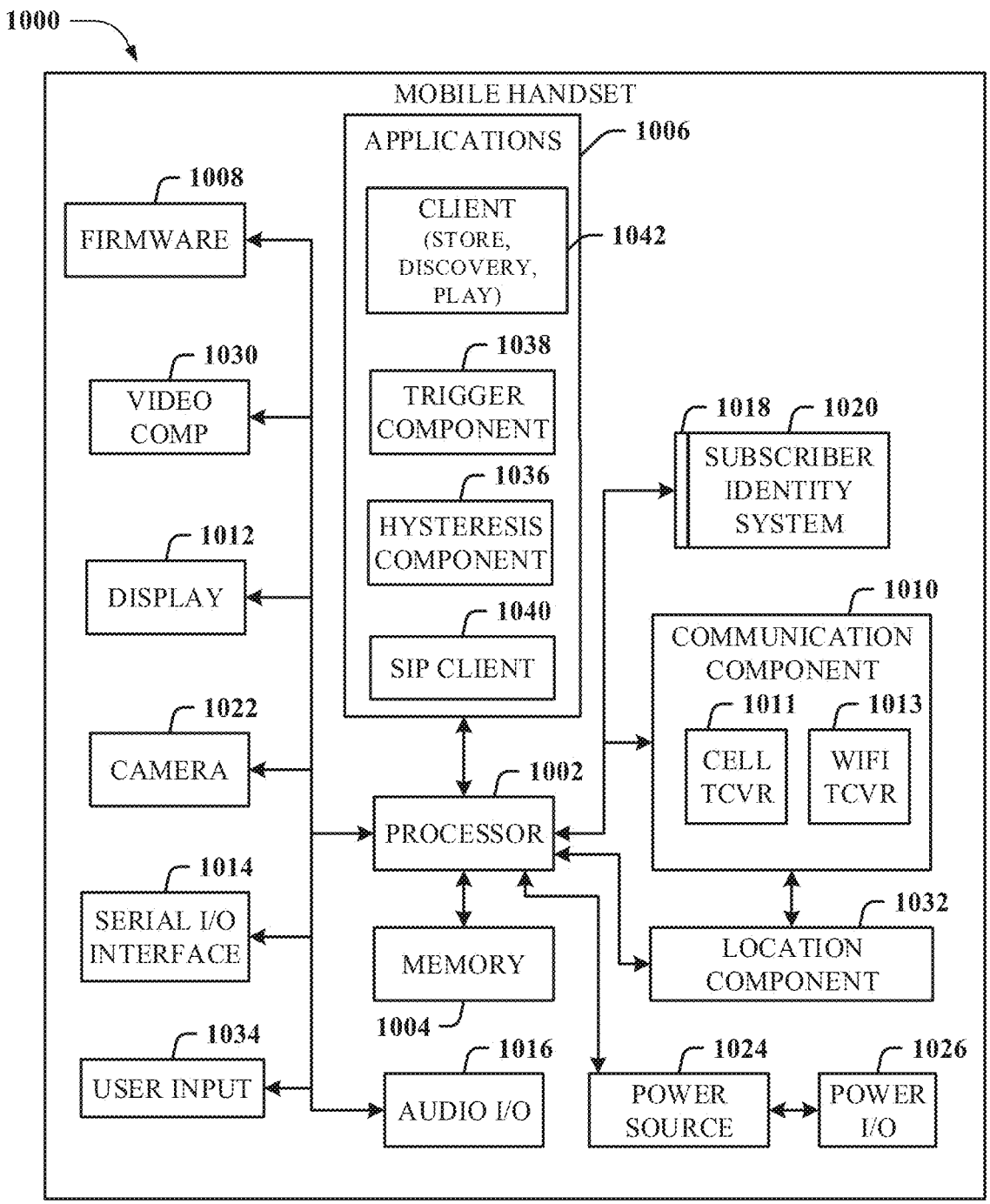
FIG. 10 illustrates an example block diagram of an example mobile handset operable to engage in a system architecture that facilitates secure wireless communication according to one or more embodiments described herein.

Referring now to FIG. 10, illustrated is a schematic block diagram of an exemplary end-user device such as a mobile device 1000 capable of connecting to a network in accordance with some embodiments described herein. Although a mobile handset 1000 is illustrated herein, it will be understood that other devices can be a mobile device, and that the mobile handset 1000 is merely illustrated to provide context for the embodiments of the various embodiments described herein. The following discussion is intended to provide a brief, general description of an example of a suitable environment 1000 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1000 includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1010 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks.

The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communication component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or decoded format.

A video processing component 1022 (e.g., a camera) can be provided for decoding encoded multimedia content. The video processing component 1022 can aid in facilitating the generation, editing and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1038 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.xx, for the dual-mode GSM handset 1000. The handset 1000 can accommodate at least satellite radio services through a handset that can combine wireless voice and digital radio chipsets into a single handheld device.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium. Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Figure 11:
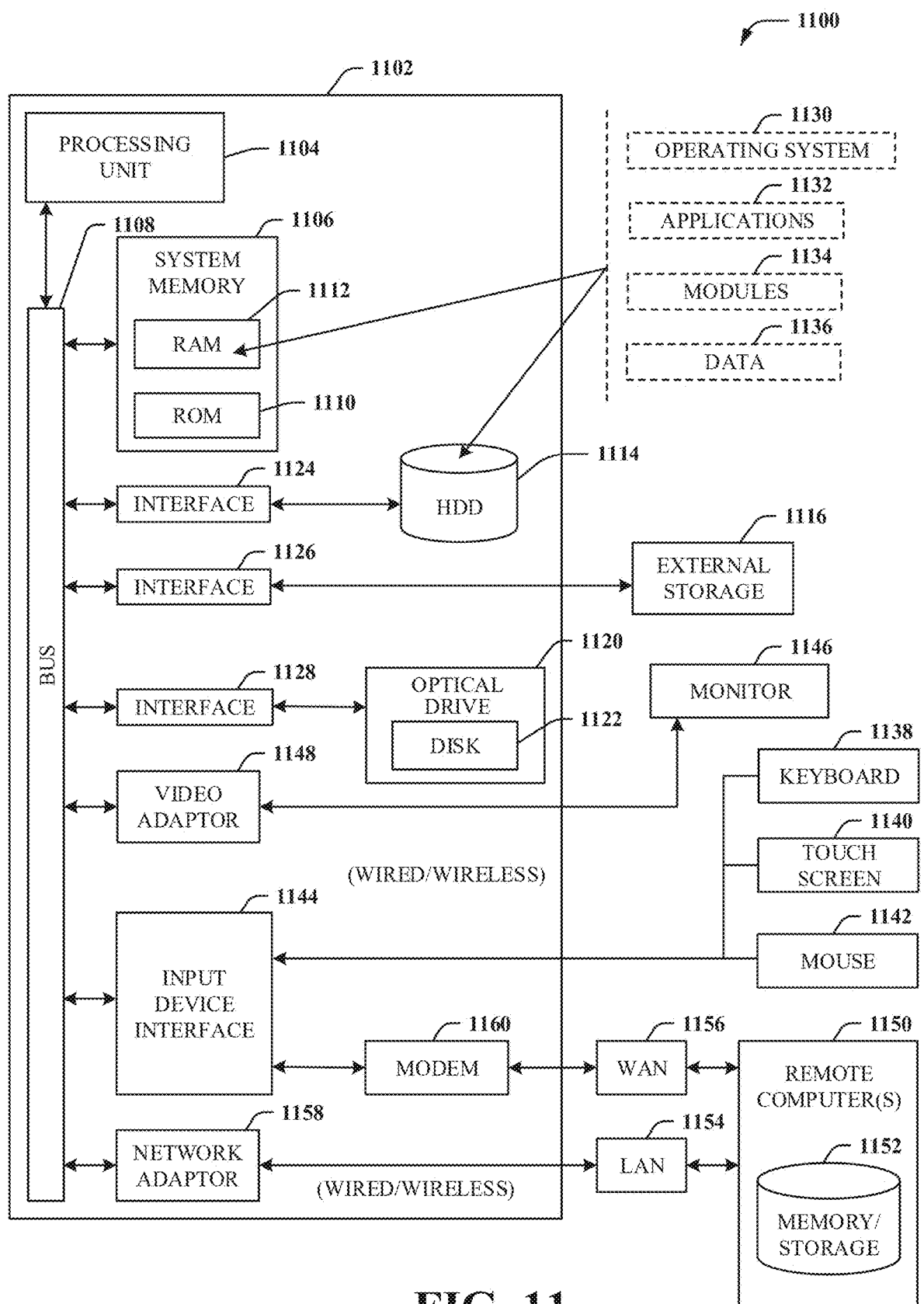
FIG. 11 illustrates an example block diagram of an example computer operable to engage in a system architecture that facilitates secure wireless communication according to one or more embodiments described herein.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.xx (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    based on measurement reports from a group of user equipment, determining, by a base station comprising a processor, a first channel for which a quantity of user equipment of the group of user equipment, exceeding a threshold quantity, is not reporting measurements;
    relinquishing, by the base station, a first authorization for the base station to transmit via the first channel; and
    obtaining, by the base station, from a spectrum administration device, a second authorization for the base station to transmit via a second channel different from the first channel.

2. The method of claim 1, further comprising:
    broadcasting, by the base station, via a third channel, an indication of an availability of the base station to communicate via the second channel to the group of user equipment, wherein the third channel is different from the first channel and the second channel.

3. The method of claim 2, further comprising:
    in response to broadcasting the indication, receiving, by the base station, a request from a user equipment of the group of user equipment to communicate via the second channel.

4. The method of claim 2, wherein broadcasting the indication comprises broadcasting the indication via a system information block of the third channel.

5. The method of claim 2, wherein the availability of the base station to communicate via the second channel is a first availability, wherein the indication further indicates a second availability of the base station to communicate via a fourth channel to the group of user equipment, and wherein the fourth channel is different from the first channel, the second channel, and the third channel.

6. The method of claim 5, further comprising:
    in response to broadcasting the indication, receiving, by the base station, a request from a user equipment of the group of user equipment to communicate via the fourth channel.

7. The method of claim 1, further comprising:
    prior to the obtaining, sending, by the base station, to the spectrum administration device, an authorization request for the base station to be authorized to transmit via the second channel.

8. A network node device, comprising:
    a processor; and
    a memory that stores executable instructions that, when executed by the processor, facilitate performance of operations, comprising:
        based on measurement reports from a group of user equipment, determining a first channel for which a subgroup of user equipment of the group of user equipment, exceeding a threshold size, is not reporting measurements;
        surrendering a current authorization for the network node device to transmit on the first channel; and
        acquiring, from a spectrum administration device, approval for the network node device to transmit on a second channel different from the first channel.

9. The network node device of claim 8, wherein the operations further comprise:
    broadcasting, via a third channel, an indication of availability of the network node device for communication via the second channel to the group of user equipment, wherein the third channel is different from the first channel and the second channel.

10. The network node device of claim 9, wherein the operations further comprise:
    in response to broadcasting the indication, receiving a request from a user equipment of the group of user equipment to communicate via the second channel.

11. The network node device of claim 9, wherein the indication is broadcasted via a system information block of the third channel.

12. The network node device of claim 9, wherein the indication further indicates availability of the network node device for communication via a fourth channel to the group of user equipment, and wherein the fourth channel is different from the first channel, the second channel, and the third channel.

13. The network node device of claim 12, wherein the operations further comprise:

in response to broadcasting the indication, receiving a request from a user equipment of the group of user equipment to communicate via the fourth channel.

14. The network node device of claim 9, wherein the operations further comprise, prior to the acquiring, sending, to the spectrum administration device, a request to approve the network node device to transmit on the second channel.

15. A non-transitory machine-readable medium, comprising executable instructions that, when executed by a processor of a network device, facilitate performance of operations, comprising:
  based on measurement reports from a group of mobile devices, determining a first channel for which at least a threshold number of mobile devices of the group of mobile devices is not reporting measurements;
  ending an authorization for the network device to transmit via the first channel; and
  procuring, from a spectrum administration device, consent for the network device to transmit via a second channel different from the first channel.

16. The non-transitory machine-readable medium of claim 15, wherein the operations further comprise:
  broadcasting, via a third channel, an indication of a first availability of the network device to communicate via the second channel to the group of mobile devices, wherein the third channel is different from the first channel and the second channel.

17. The non-transitory machine-readable medium of claim 16, wherein the operations further comprise:
  in response to broadcasting the indication, receiving a request from a mobile device of the group of mobile devices to communicate via the second channel.

18. The non-transitory machine-readable medium of claim 16, wherein the indication is broadcasted via a system information block of the third channel.

19. The non-transitory machine-readable medium of claim 16, wherein the indication further indicates a second availability of the network device to communicate via a fourth channel to the group of mobile devices, and wherein the fourth channel is different from the first channel, the second channel, and the third channel.

20. The non-transitory machine-readable medium of claim 19, wherein the operations further comprise:
  in response to broadcasting the indication, receiving a request from a mobile device of the group of mobile devices to communicate via the fourth channel.

* * * * *